United States Patent [19]

Takaki et al.

[11] 4,298,958
[45] Nov. 3, 1981

[54] SEQUENCE CONTROL SYSTEM

[75] Inventors: Masaoki Takaki; Hirokazu Sawano; Kunio Yamanaka; Kazuyoshi Asada, all of Hitachi; Keiji Hideshima, Fujisawa; Haruo Koyanagi, Ome, all of Japan

[73] Assignees: Hitachi, Ltd., Tokyo; Nissan Motor Co., Ltd., Yokohama, both of Japan

[21] Appl. No.: 73,370

[22] Filed: Sep. 7, 1979

[30] Foreign Application Priority Data

Sep. 13, 1978 [JP] Japan .................................. 53-111662
Sep. 13, 1978 [JP] Japan .................................. 53-111663

[51] Int. Cl.³ ........................ G05B 11/00; G06F 9/06; G06F 11/00
[52] U.S. Cl. ........................................ 364/900; 371/19
[58] Field of Search ................ 364/900, 200; 371/19, 371/25, 29

[56] References Cited

U.S. PATENT DOCUMENTS

| | | | |
|---|---|---|---|
| 3,829,842 | 8/1974 | Langdon et al. | 364/900 |
| 3,944,987 | 6/1976 | Koyanagi et al. | 364/900 |
| 3,964,026 | 6/1976 | Yamauchi et al. | 364/900 |
| 4,063,311 | 12/1977 | Jeremiah et al. | 364/900 |

*Primary Examiner*—David H. Malzahn
*Attorney, Agent, or Firm*—Craig and Antonelli

[57] ABSTRACT

A sequence control system suitable for checking the operation of an information processor includes a process I/O unit for receiving input data from process inputs and providing output data to process outputs; a sequence processing unit for calculating data at the process outputs by performing sequence operations according to the sequence programs stored in a sequence program memory on the basis of the data at the process inputs; a buffer memory provided between the process I/O unit and the sequence processing unit for storing both the process input data from the process I/O unit and the output data from the sequence processing unit; a control arrangement for setting the input data to the buffer memory and for allowing access to a selected sequence program according to manually set input information; a display for displaying the selected sequence program accessed through the control arrangement; and a switch for interrupting the transfer of I/O data between the process I/O unit and the buffer memory. The sequence processing unit determines the output data on the basis of the input data stored in the buffer memory and applies the output data to the buffer memory. The control arrangement, in response to the manually set input information, causes the associated sequence program to be read from the sequence program memory and then the data of the inputs and outputs associated with the sequence program to be read from the buffer memory thereby to indicate them on the display.

3 Claims, 18 Drawing Figures

| ADDRESS $AD_1$ | MACHINE WORD FOR BRANCH INFORMATION $OP_1$ | MACHINE WORD FOR CONTACT INFORMATION $OP_2$ | MACHINE WORD FOR CONTACT NUMBER INFORMATION $AD_2$ |
|---|---|---|---|
| $W_1$ | 101 | φφ | φφφ |
| $W_2$ | 110 | 00 | 1001 |
| $W_3$ | 111 | 00 | 1002 |
| $W_4$ | 100 | φφ | φφφ |
| $W_5$ | 011 | 00 | 1003 |
| $W_6$ | 111 | φφ | φφφ |
| $W_7$ | 011 | 10 | 2001 |

FIG. 7

| SETTING INFORMATION BY KEYBOARD 3 | | | MEMORY FOR STORING SEQUENCE PROGRAM | | |
|---|---|---|---|---|---|
| BRANCH INFORMATION $S_{32}$ | CONTACT INFORMATION $S_{33}$ | CONTACT NUMBER $S_{34}$ | MACHINE WORD FOR BRANCH INFORMATION $OP_1$ | MACHINE WORD FOR CONTACT INFORMATION $OP_2$ | CONTACT NUMBER ADDRESS ADDR |
| ─── | ─┤├─ | X001~X00N OR Y001~Y00N | 111 | 00 | 1001~100N OR 2001~200N |
|  | ─○─ |  |  | 10 |  |
| ┬ | ─┤├─ | SAME AS ABOVE | 110 | 00 | SAME AS ABOVE |
|  | ─○─ |  |  | 10 |  |
| ├ | ─┤├─ | SAME AS ABOVE | 101 | 00 | SAME AS ABOVE |
|  | ─○─ |  |  | 10 |  |
| ┐ |  |  | 100 | φφ | φφφφ |
| └ ┴ | ─┤├─ | X001~X00N OR Y001~Y00N | 011 | 00 | 1001~100N OR 2001~200N |
|  | ─○─ |  |  | 10 |  |
| ├ ┼ | ─┤├─ | SAME AS ABOVE | 010 | 00 | SAME AS ABOVE |
|  | ─○─ |  |  | 10 |  |
| │ ┘ |  |  | 000 | φφ | φφφφ |

SEQUENCE CONTROL SYSTEM

BACKGROUND OF THE INVENTION

The present invention relates to a sequence control system, and more particularly, to a system which is designed to check the operation of an information processor during the operation thereof.

In a conventional sequence control system, a desired sequence instruction is read from the sequence program, and the sequence is processed and controlled in its processing circuit. Such a sequence control system has already been disclosed, for example, in U.S. Pat. No. 3,944,987 to Koyanagi et al. Further, a sequence block display system of the kind referred to has been suggested in U.S. Pat. No. 3,964,026 to Yamauchi et al, in which a sequence circuit block is searched in the memory section thereby displaying it.

However, in the known programmable logic controller (PLC), the check of the logic and operation, such as debugging at the side of the processing unit, is performed through a process I/O controller (PIOC). There are known a conventional system, as shown in FIG. 1, in which connection is established between a sequence processing unit 100 (which corresponds to the abovementioned processing unit), a process control section 200 and a production installation 300; and the operation check is made under the condition where the production installation 300 (usually, process system) is in operation. Now, the process control section 200 includes a process I/O controller (PIOC) and a process I/O unit (PI/O). Such a system is characterized in that the operation check is made after the production installation is built, and so, the sequence programs are debugged after the production installation is built.

However, in general, many PLC users tend to desire to build-in the sequencer according to the situation where a new production installation is being built. To this end, if the operation check of the sequence programs can be performed only after the production installation has been built to a certain extent, the system will be low in work efficiency. In addition, debugging requires connection between the process control section and the actually-built production installation. This may damage devices in the production installation and in some cases, may lead to serious injury to the operators.

In order to eliminate the above-mentioned defects, there has been suggested another system shown in FIG. 2 in which a simulation panel is added in place of the production installation. As will be understood from FIG. 2, the production installation in FIG. 1 is replaced by a simulation panel 400 and debugging is carried out within the factory.

The simulation panel 400 is mounted with a multiplicity of (for example, in the order of thousands) switches for setting input data and a multiplicity of (for example, in the order of thousands) lamps for checking the states of outputs, which switches and lamps are associated with process inputs and outputs respectively. Since use of the simulation panel 400 allows debugging to be carried out together with building of the production installation, the work steps are greatly reduced, without the danger of device damage or of serious injury to the operators, as mentioned above.

Nevertheless, this type of system utilizing a simulation panel has defects in that the system is expensive due to the fact that the simulation panel is provided with thousands of switches; and additional complicated wirings (usually, 2000 to 4000) must be completed between the simulation panel and the process I/O unit PI/O, resulting in time-consuming labor and high cost. This is because the above-mentioned system of FIG. 1 requires connection only between the PI/O and the production installation, but in the system of FIG. 2, additional connection must be provided to the simulation panel.

These defects come from the fact that an attempt has been made to check the operation, using a conventional process control section. In other words, an operation check at the side of the sequence processing unit always requires reception of information of the process inputs and transmission of the processed results to process outputs. To realize this, in addition to the above inputs and outputs, an interface between the inputs and outputs and the sequence processing unit must be provided. In the conventional system, a known process control section has been used as such an interface. As a result, the number of wiring points was required. In another point of view, a check at the side of the sequence processing unit is carried out by checking the outputs corresponding to the associated inputs. This means that this method restricts the checking at the sequence processing unit. Further, the application of an input data at an input terminal may cause the output states at output terminals to change. In this case, it is difficult to detect such changes in output states at the output terminals with the above-mentioned sequence panel. Furthermore, it is difficult to cope with a request to provide information relating to the current and previous states of the output terminals. In summary, the above-mentioned systems have a defect in that they do not provide flexibility in performing the logical operation check.

SUMMARY OF THE INVENTION

Accordingly, it is an object of the present invention to provide an improved sequence control system in which the defects mentioned above are eliminated.

This object is achieved by the present invention in which a buffer memory for storing input and output data is built in a process I/O controller, the buffer memory is settable with the input data by software in place of setting it through a process I/O unit, so that the I/O data is transferred between a sequence processing unit and the buffer memory, and electrical isolation is provided between the sequence processing unit and the process I/O unit.

BRIEF DESCRIPTION OF THE DRAWINGS

The present invention will be described in conjunction with the accompanying drawings, in which:

FIG. 7 is a table showing the relationship between set informations of sequence circuits which are set by means of a keyboard and the associated machine words;

Figure 1:
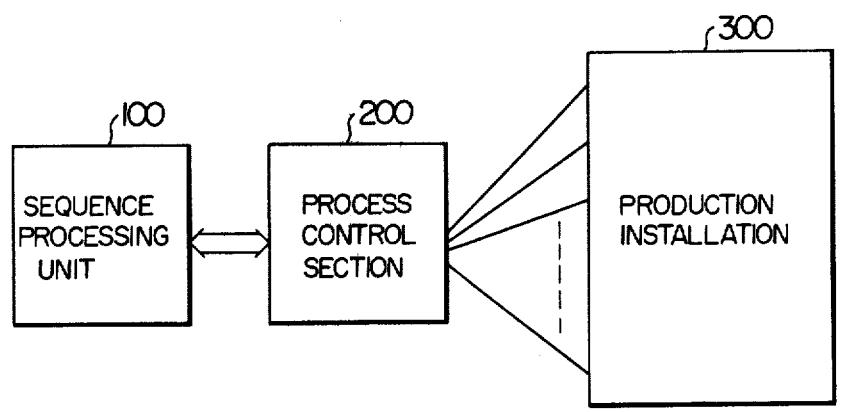
FIGS. 1 and 2 are block diagrams of conventional sequence control systems.
Figure 2:
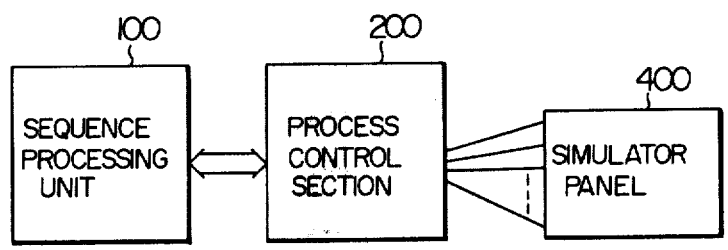
Figure 3:
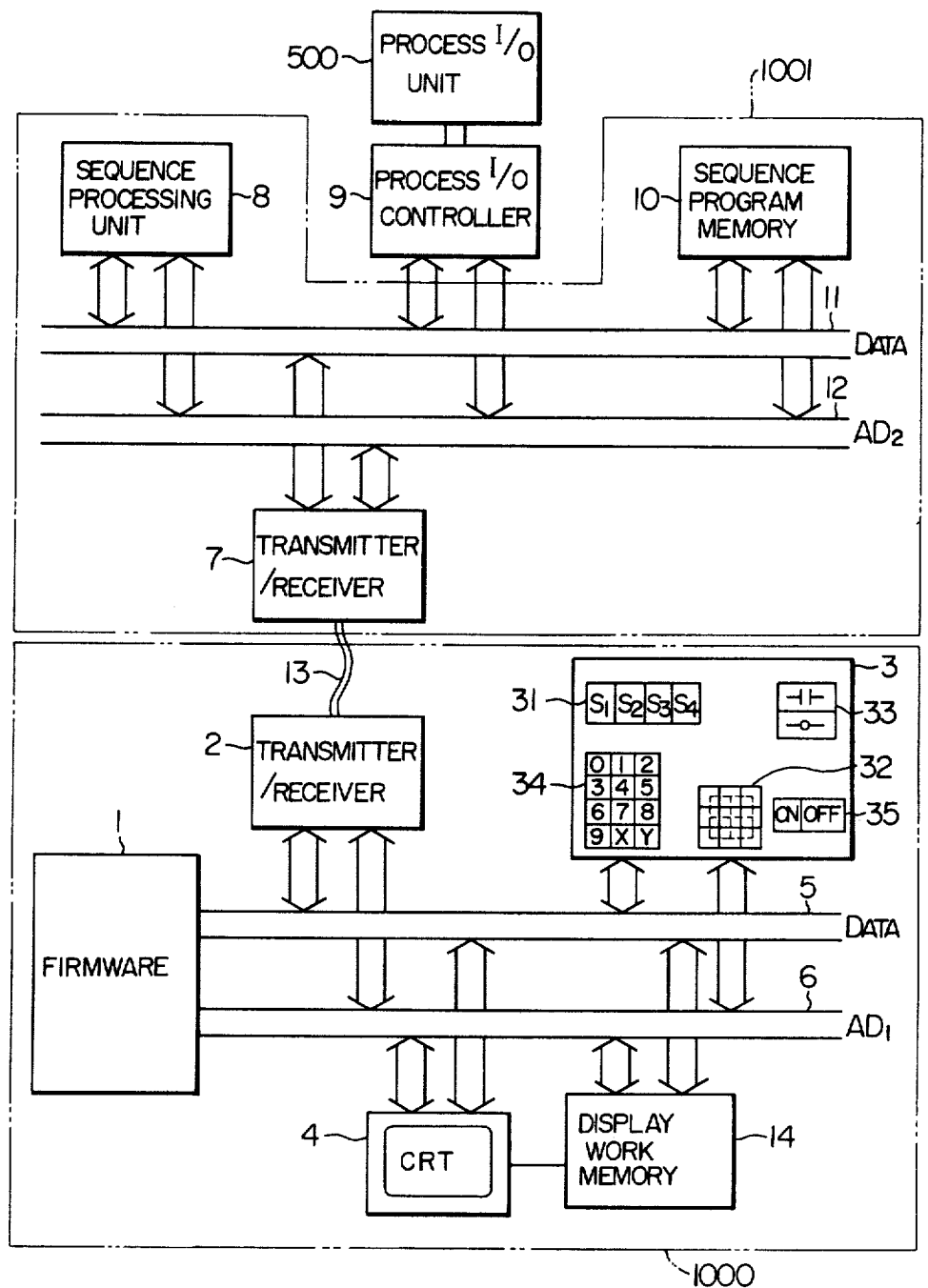
FIG. 3 is a block diagram of a first embodiment of a sequence control system according to the present invention.

Now, a sequence control system according to the present invention will be described with reference to FIG. 3. There is shown in FIG. 3 a block diagram of the first embodiment of the sequence control system according to the present invention. In the figure, a sequence processing section 1001 includes a sequence processing unit 8, a memory 10 for storing sequence programs, a transmitter/receiver 7, a data bus 11, and an address bus 12. A process I/O controller 9 contains a buffer memory. Through the process I/O controller 9, a process I/O unit (PIO) 500 can be electrically isolated from the sequence processing section. Access to the buffer memory in the process I/O controller 9 is available from the side of the sequence processing section 1001. For this reason, the buffer memory can be efficiently used as a memory for temporarily storing various types of I/O data which are contained in the sequence processing section 1001. The sequence processing section 1001 is connected through a communication line 13 to a programming section 1000. The programming section 1000 contains a firmware 1, a data transmitter/receiver 2, a setting keyboard 3, CRT 4, a display work memory 14, a data bus 5, and an address bus 6.

The keyboard 3 is provided with mode buttons 31, branch buttons 32 for setting branching of sequence programs, contact buttons 33 for setting the contact thereof, contact number buttons 34 for setting the contact number thereof, and contact ON/OFF buttons 35 for specifying on/off states of the contact, for simulation.

Figure 9:
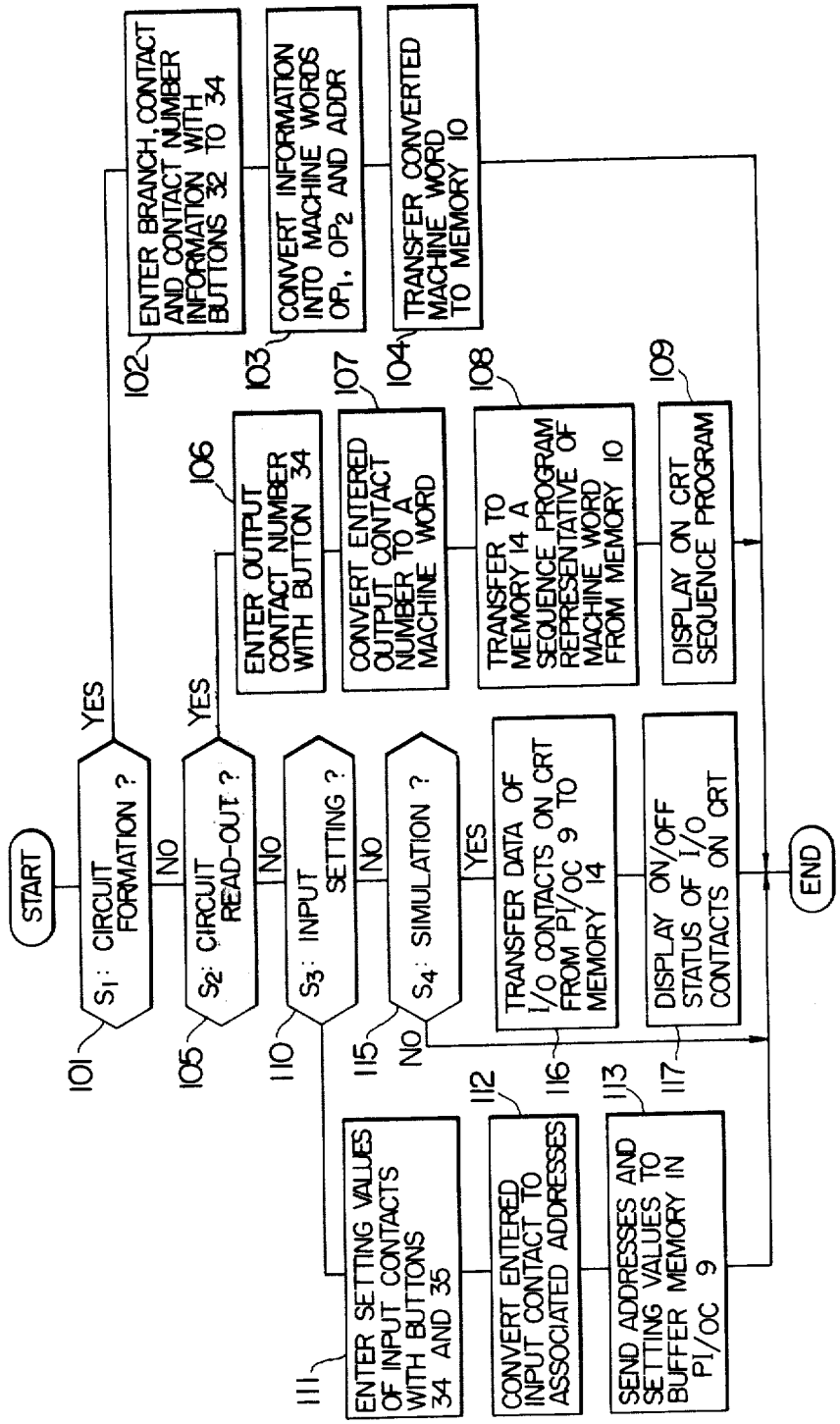
FIG. 9 is a flow chart of firmware related to the system of FIG. 3.

A ROM is built into the firmware 1 to store software which operates according to the flow chart shown in FIG. 9.

Figure 4:
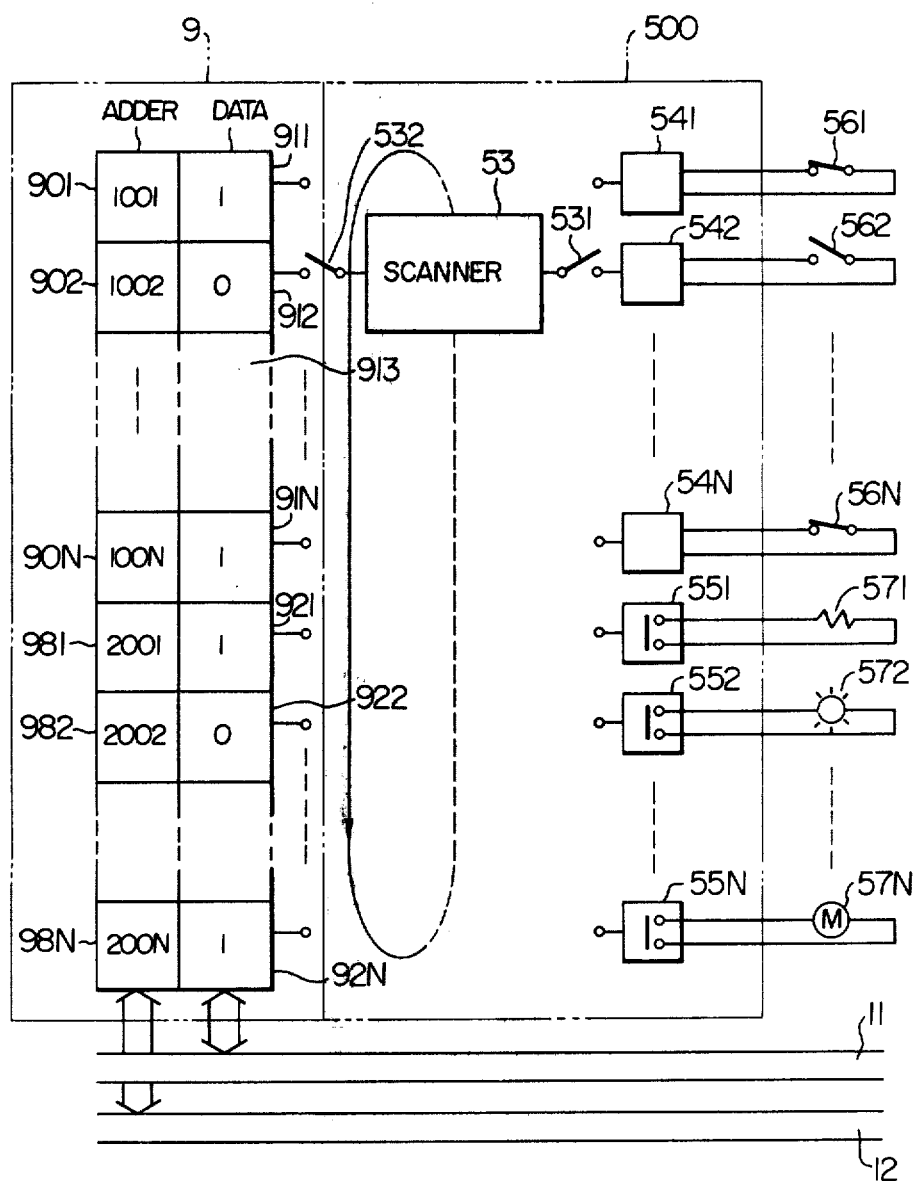
FIG. 4 is a circuit diagram of a process I/O controller and a process I/O unit as provided in FIG. 3.

FIG. 4 shows the detailed circuit diagram of the process I/O controller 9 and the process I/O unit 500. As described before, the process I/O controller 9 contains the buffer memory. In FIG. 4, the buffer memory includes address gates 901, 902, . . . , 90N; 981, 982, . . . , 98N, corresponding to address areas 1001 to 100N, 2001 to 200N respectively. Further, the buffer memory includes the data areas 911, 912, . . . , 91N; 921, 922, . . . , 92N corresponding to the address areas 1001 to 100N, 2001 to 200N respectively. In this arrangement, 90i and 91i (i=1, 2, . . . , N) form a storage area for input contacts, while 98j and 92j (j=1, 2, . . . , N) form a storage area for output contacts. The process I/O unit 500 has a scanner 53 and signal conditioners or level converters 541, 542, . . . , 54N; 551, 552, . . . , 55N. The level converters 541, 542, . . . , 54N are connected respectively to process input contacts 561, 562, . . . , 56N, and each functions to convert a voltage representative of ON/OFF state of the associated input contact to a predetermined level, for example, 0 or +5 V. On the other hand, the level converters 551, 552, . . . , 55N are connected respectively to process outputs 571, 572, . . . , 57N, and each functions to convert output data from the associated output data areas 921, 922, . . . , 92N via the scanner to a predetermined level and apply it to the associated process outputs. The process output 571, 572 and 57N are, for example, a solenoid, a lamp, and a motor respectively.

In response to a scanning clock from an oscillator built in the scanner, the scanner 53 at first connects the level converter 541 to the input data area 911, and thereafter connects the level converter 542 to the input data area 912 in response to a next scanning clock, thus connecting the lever converters 541 to 54N to the input data areas 911 to 91N sequentially thereby to apply input signals representative of the states of the input contacts to the input data areas 911, 912, . . . , 91N. In the same manner, the output data areas 921, 922, . . . , 92N are scanned sequentially in response to the scanning clocks, in turn, thereby to supply the output data to the associated level converters 551, 552, . . . , 55N. Scanning of the I/O data through the scanner can be stopped by a scanning switch (not shown) provided in the sequence processing section 1001. That is, turning the scanning switch off will cause the scanning movement of the scanner 53 to stop, for example, in such a manner that the scanning clock is made invalid through a gate in response to turning off the scanning switch, and switch 532 between the scanner and the I/O data areas and switch 531 between the scanner and the level converter to turn off, whereby the buffer memory is separated electrically from the process I/O unit 500. Turning the scanning switch on will cause the scanner 53 to be activated and to start scanning. On/off state of the scanning switch may be indicated by means of a lamp (not shown) on the keyboard 3, which allows the operator to easily know whether or not the process I/O unit 500 is connected to the buffer memory in the process I/O controller 9.

Figure 5:
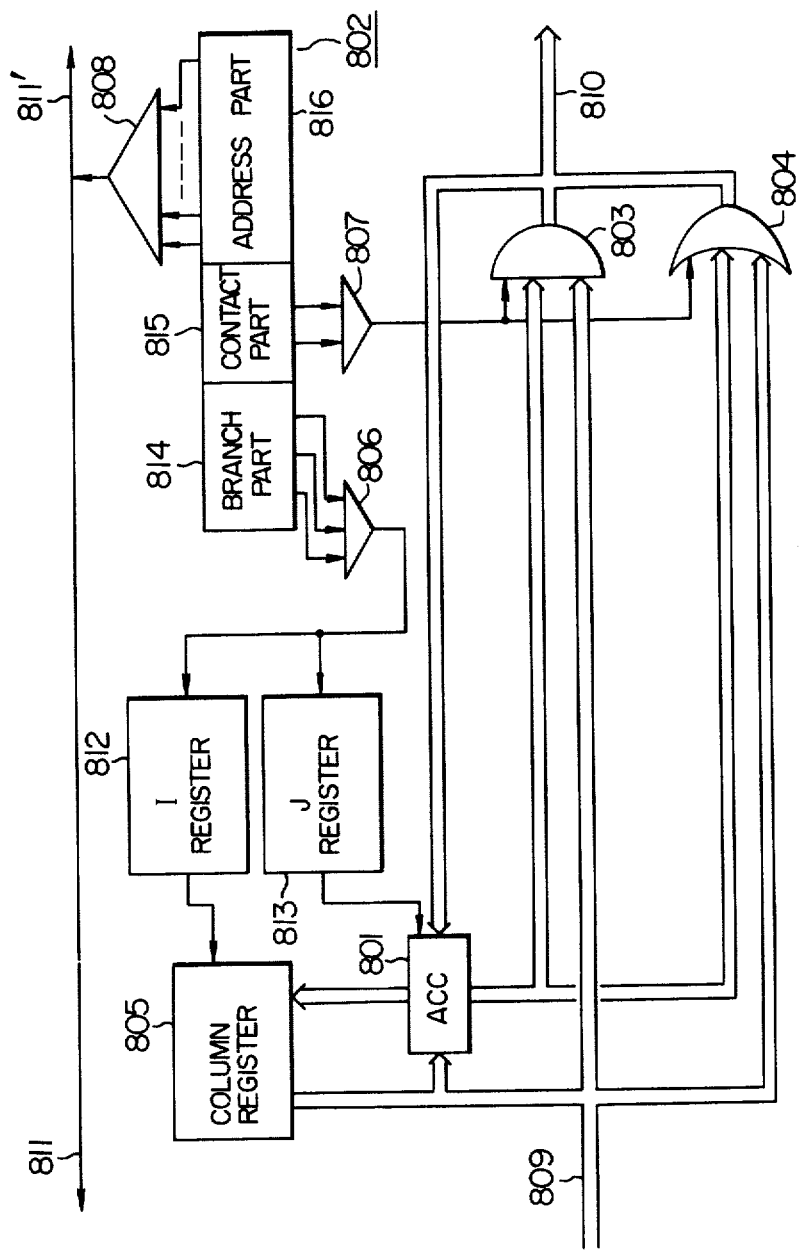
FIG. 5 is a circuit diagram of a sequence processing unit as provided in FIG. 3.

The sequence processing unit 8 is provided to read sequence instructions of a sequence circuit stored in the sequence program memory 10 in the form of sequence programs, calculate the output of the associated sequence program according to the input data of the buffer memory, and supply the calculated output to the associated output data area in the buffer memory. This operation of the sequence processing unit 8 is repeated sequentially one by one for all sequence programs. This type of sequence processing unit 8 for processing branch data of a sequence circuit is disclosed, for example, in U.S. patent application Ser. No. 075,221, filed on Sept. 13, 1979, assigned to the same assignee as the present invention, and entitled 'Sequence Display Controlling Method and Control'. FIG. 5 shows the circuit diagram of the sequence processing unit of the type referred to.

In FIG. 5, 802 is an instruction register, 814, 815 and 816 branch part, contact part, and address part of the instruction register 802, respectively, 806 to 808 decoders, 801 an accumulator, 805 a column register, 803 an AND gate, 804 an OR gate, 809 an input contact data line, 810 an output relay data line, 811 an input contact address line, and 811' an output relay address line. In addition, 812 is an I register and 813 a J register.

The instruction register 802 to provided to store machine words sent from the sequence program memory 10, and decode the branch information stored in the branch part 814 through the decoder 806. In the presence of a branch to a lower direction, the decoder 806 supplies a control signal to the I register 812, and in the presence of a branch from an upper direction, the decoder supplies another control signal to the J register 813. In response to these control signals, the contents of the accumulator 801 are placed in the column register 805, or on the contrary, the contents of the column register 805 are stored in the accumulator 801. The input contact states of the data areas in the process I/O controller set via the input data line 809 is applied to the AND gate 803 or the OR gate 804 together with the content of the accumulator 801, and the result through the gate 803 or 804 is applied to the output data line 810.

On the other hand, the contact information stored in the contact part 815 of the instruction register is applied to the decoder 807 which in turn applies a control signal to the AND gate 803 or the OR gate 804.

Finally, the address data stored in the address part 816 of the instruction register is applied to the decoder 808 which in turn applies a signal to the address line 811 associated with input contacts or to the address line 811' associated with output relays.

Figure 11:
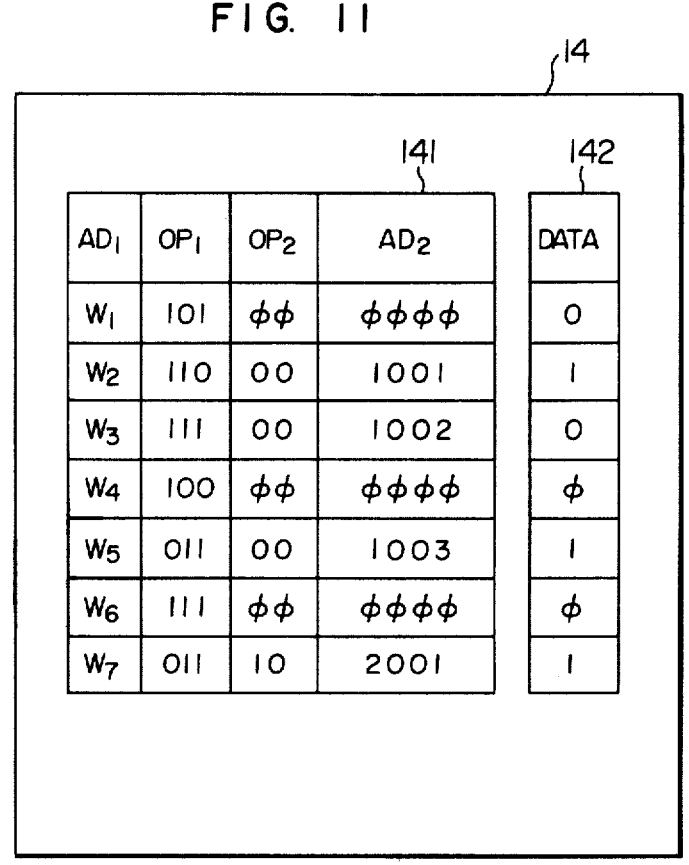
FIG. 11 is an example of the information of a sequence circuit which is stored in a display work memory as provided in FIG. 3.

There is shown in FIG. 11 a sample of the contents stored in the display work memory 14 which has area 141 for storage of machine words of a sequence circuit read through the keyboard 3, and area 142 for storage of on/off states of I/O contacts in the sequence circuit read from the buffer memory through the setting by the keyboard 3, as will be described in detail later.

Prior to starting simulation, sequence programs to be processed must be stored in the sequence program memory 10. For example, a sequence program is a sequence circuit translated into machine words according to the relationship between the circuit setting information and the machine words of FIG. 7.

Figures 6, 8:
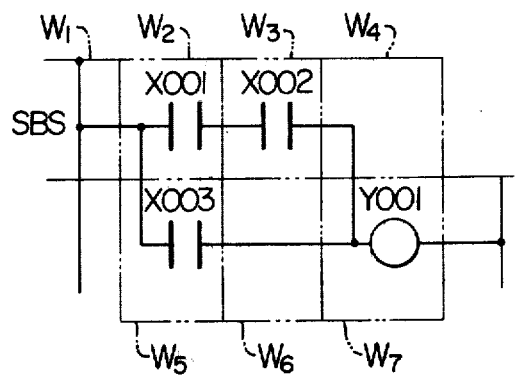
FIG. 6 is an example of a sequence circuit.
FIG. 8 is a table showing the relationship between machine words of the sequence circuit in FIG. 6 and the associated address in the sequence program memory.

A sequence circuit exemplified in FIG. 6 can be indicated on the CRT 4 by pushing sequentially the control buttons 31 to 34 on the keyboard 3. At the same time, the branch, contact, and contact number information of the sequence circuit are stored as machine words shown in FIG. 8 in the sequence program memory 10.

Referring to FIG. 9, pushing a circuit forming button $S_1$ of the mode buttons 31 at step 101 will cause the software necessary for formation in the firmware 1 to activate. Then, setting the branch, contact and contact number information of row 1, column 1 by means of the buttons 32 to 34 at step 102. This information is translated into machine words by firmware at step 103. At step 104, a sequence block start (SBS) signal is set at address $W_1$ in the sequence program memory through the data transmitter/receiver 2, the communication line 13 and the data transmitter/receiver 7; and at the same time, machine words $OP_1(101)$, $OP_2(\phi\phi)$, and $AD_2(\phi\phi\phi\phi)$ respectively representing branch, contact and contact number information shown in FIG. 8 are stored in the memory. Where, $\phi$ means that any of '0' or '1' can be used.

Next, pushing the buttons 32 to 34 to set information of an input contact X001 of row 1, column 2 will make store the machine words of the set information at address $W_2$ in the sequence program memory 10. In the similiar manner, information on an I/O contacts X002 to Y001 of row 1 and column 3, row 2 and column 1, row 2 and column 2, and row 2 and column 3, are stored sequentially as shown in FIG. 8. In this way, a multiplicity of sequence programs are stored in the sequence program memory 10.

Next, explanation will be made hereinafter of how to simulate the stored sequence programs. First, the simulation of sequence circuits will be described with reference to FIG. 9, wherein the sequence circuits are operated according to the input contact data supplied from the process I/O unit.

The first step for effecting simulation is to read out a desired sequence circuit from the sequence program memory. Depression of a circuit read-out button $S_2$ of the mode buttons 31 on the keyboard (step 105) will cause the software relating to the circuit read-out of the firmware 1 to start. Selecting a desired output contact by pushing an output contact button 33 (for example a button marked with —o—) and keying-in an output contact number, for example, Y001 by means of the contact number buttons 34 (step 106) will cause the output contact number Y001 to be translated into machine words by means of the firmware, thereby to access to the sequence program memory 10 (step 107). Then, the sequence program representative of the translated machine words relating to the output contact number Y001, i.e., the sequence circuit shown in FIG. 6 is read to transfer to the area 141 of the display work memory 14 (step 108) thereby displaying the sequence circuit on CRT 4.

Figure 10:
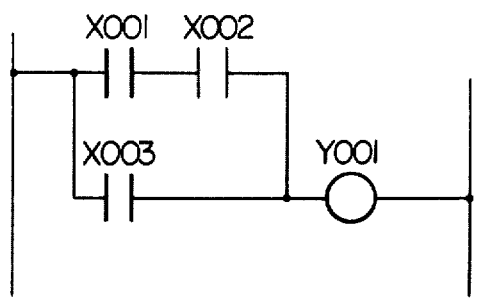
FIG. 10 is an example of the sequence circuit which is displayed on a CRT according to the flow chart in FIG. 9.

Next, operations will be described for reading the states of the I/O contacts in the read sequence circuit and indicating them on CRT 4. With depression of a simulation button $S_4$ of the mode buttons 31 on the keyboard 3 (step 115), the present input data of input contacts X001, X002, and X003 in the sequence circuit on the CRT will be read from the input data areas of the buffer memory 9 to send to the area 142 of the display work memory 14. At the same time, the output data calculated in the sequence processing unit 8 according to the input contact data is read from the output data areas of the buffer memory to transfer to the area 142 of the display work memory 14 (step 116). The read I/O contact data is displayed on CRT 4, for example, as shown in FIG. 10 (step 117) in which contacts in ON states are drawn with heavy lines and contacts in OFF states are drawn with light lines.

In this way, the states of I/O contacts in a selected sequence circuit can be displayed on the CRT by pushing the selected buttons on the keyboard.

Next, description will be made of how to execute an sequence operation in accordance with input contact data provided by software instead of input contact data provided through the process I/O unit.

In this case, at first, it is necessary to turn the scanning switch off to stop the scanner 53. This will electrically separate the buffer memory 9 from the process I/O unit 500.

Then, push the circuit read-out button $S_2$ of the mode buttons 31 on the keyboard 3 to activate the software necessary for reading out the sequence circuit of the firmware 1. Thereafter, displaying the sequence circuit on CRT 4 in the similar manner described above in accordance with the steps 105 to 109 in FIG. 9.

The next step is to set data (on/off state information) of the input contacts of the read sequence circuit, for example, in FIG. 6, to set the data of the input contacts X001, X002 and X003. For this purpose, depress an I/O button S3 of the mode buttons 31 to activate the I/O setting software of the firmware 1 (step 110). After this, setting a contact number of the sequence circuit by the contact number buttons 34, for example, X001, and then set the ON/OFF state thereof by the contact ON/OFF button 35, for example, 'on' of the contact, yielding X001 = 1. The similar on/off setting operations are applied to the other input contacts X002 and X003. Suppose, for example, that the contact X002 is set to off (i.e. X002 = 0) and the contact X003 is set to on (i.e. X003 = 1). Under this condition, the input contact information is converted through the firmware into the corresponding addresses (step 112); the addresses and on/off setting values data of the input contacts are supplied to the buffer memory in the process I/O controller 9 and access it; and the setting data is stored in the corresponding input data areas, for example, 911, 912 and 913 of the buffer memory. Since the I/O buffer memory is always scanned by the sequence processing unit (in general, the memory may be not only scanned but also accessed randomly), the setting data is immediately processed in the processing unit as soon as the settings are placed in the buffer memory.

Finally, the following is how to read the output contact data according to the input data. Depression of the simulation button S4 on the keyboard 3 will cause the software necessary for firmware simulation to activate (step 115), whereby the data of the input contacts X001, X002 and X003 on the CRT screen is read from the input data areas 911 to 91N to send to the display work memory 14. At the same time, the data (in this embodiment, Y001 = 1) of the output contact Y001 obtained from the sequence processing unit 8 is read from the output data area, for example, 921 of the buffer memory to transmit to the display work memory 14 (step 117). Then, the I/O data placed in the display work memory 14 is indicated on the CRT, as shown in FIG. 10 (step 118).

From the foregoing, it will be seen that the operator can observe the output contact states of the sequence circuit on the CRT which is determined by the data of input contacts selected through the keyboard 3, whereby to facilitate the checking of the operation of the sequence circuit.

In addition, the buffer memory built in the process I/O controller allows simulation to take place in the manner similar to the actual movement, with good man-machineability.

Furthermore, since only the I/O buffer memory of the process I/O controller can provide simulation without the process I/O unit, manufacturing of the process I/O unit and a troublesome interconnection with the simulator panel will become unnecessary in steps, not as in the conventional steps.

Figure 12:
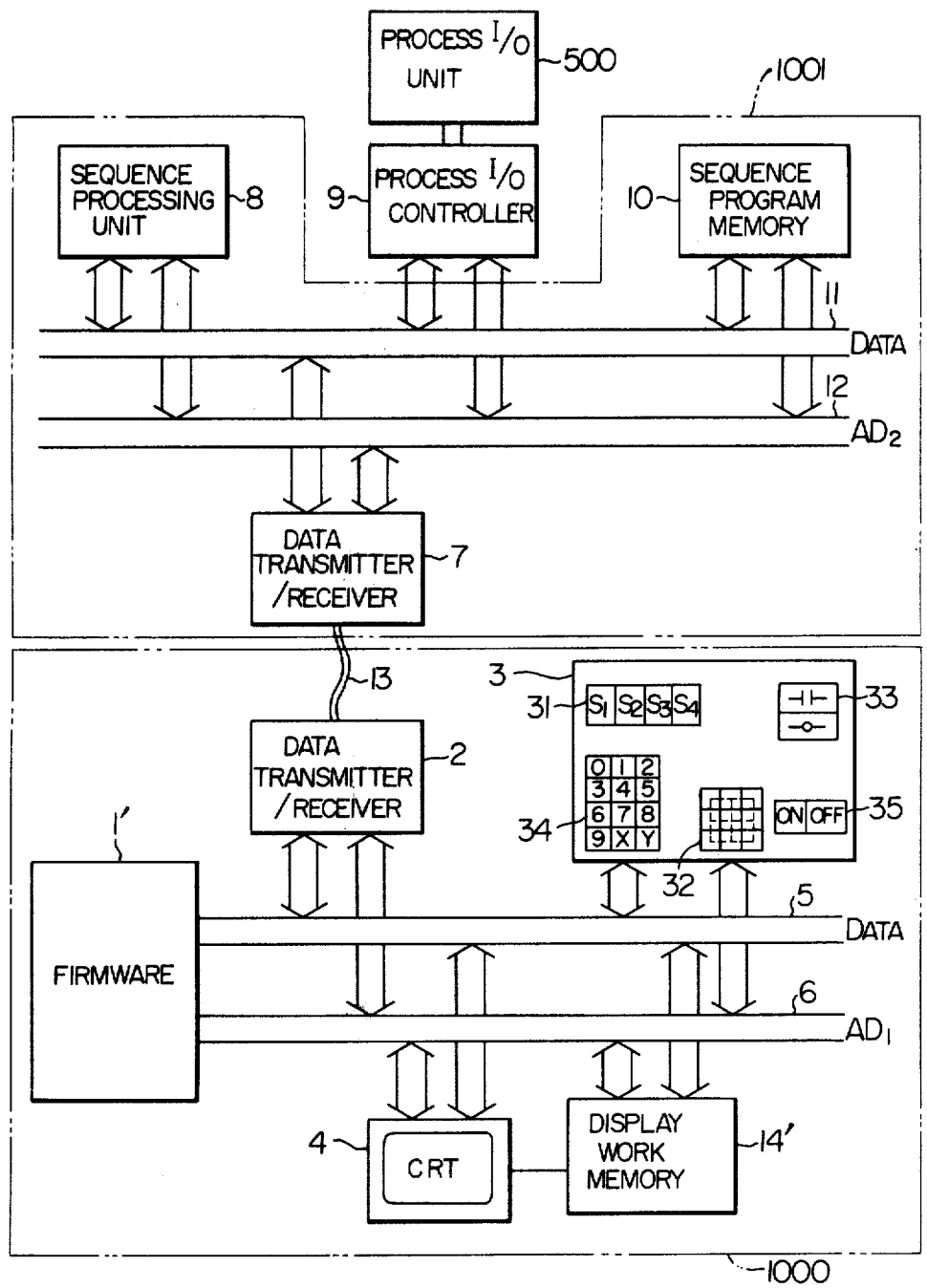
FIG. 12 is a block diagram of a second embodiment of a sequence control system according to the present invention.

Now, the present invention will be explained with reference to a second embodiment in conjunction with FIG. 12 which is the same as the first embodiment in FIG. 3, except that programs of the firmware and the arrangement of a display work memory are somewhat different from those in FIG. 3. The sequence control system according to the second embodiment of the present invention is characterized in that when the operator modifies one of the sequence programs, he can see on the CRT the modification effect on the other sequence programs.

Namely, it may be often required to modify the sequence programs due to extension or modification of the production installation, under the condition where sequence control is being carried out with production installation actually connected to the programmable logic controller. In such a case, there may be a problem that the modified sequence program will operate correctly or not. In addition, one or more of the other sequence programs may unexpectedly operate incorrectly due to the modification of the sequence program. These troubles result from the fact that the extended or modified production installation is associated with two or more sequence programs or the modification of sequence programs provides an effect indirectly on the other sequence programs.

Figure 14:
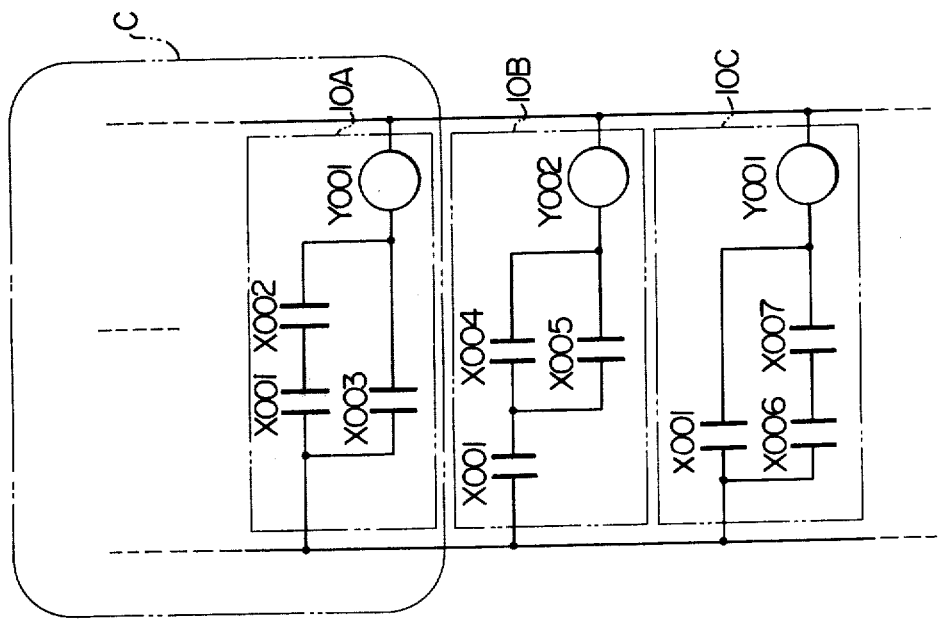
FIG. 14 is an example of a sequence circuit used for explaining the second embodiment.

In sequence circuits shown in FIG. 14, for example, an input contact X001 in a sequence circuit 10A is commonly used in two other sequence circuits 10B and 10C. For this reason, removal of the production installation related to the input contact X001 in sequence circuit 10C will provide an effect on both the sequence circuits 10A and 10B.

Since the sequence circuit 10C shares an output Y001 with the sequence circuit 10A, modification of the circuit 10A will also provide effect on the circuit 10C.

A second embodiment according to the present invention is designed so that the operator can easily observe on the CRT the effect on the other sequence programs due to the modification of a sequence program in a debugging operation thereof, as will be described below.

Referring to FIG. 14, the sequence circuit 10A includes input contacts X001, X002 and X003 and an output contact Y001. The sequence circuit 10B includes input contacts X001, X004 and X005 and an output contact Y002. Similarly, the sequence circuit 10C includes input contacts X001, X006 and X007 and output contacts Y001. The sequence circuit 10C shares the output constant Y001 with the sequence circuit 10A.

Figure 13:
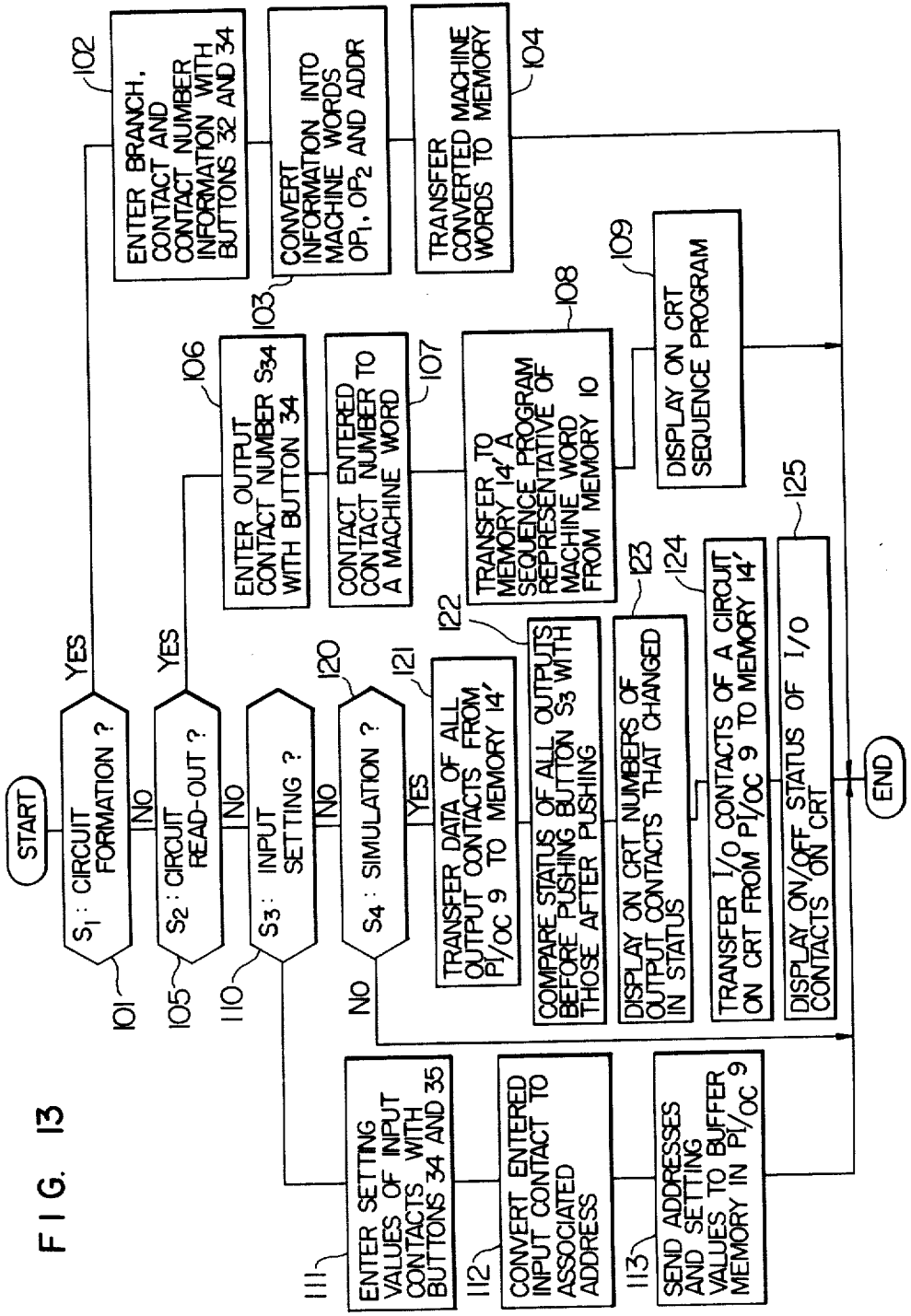
FIG. 13 is a flow chart of firmware related to the system in FIG. 12.

There is shown a flow chart of programs in a firware 1' according to the second embodiment in FIG. 13 in which steps 101 to 104 (program for forming sequence circuits), steps 105 to 109 (program for reading sequence circuits), and steps 110 to 113 (program for setting the states of input contacts of sequence circuits) are the same as those in the first embodiment.

First, explanation will proceed of how to display the change of states in sequence circuits when the scanner 53 in the process I/O unit 500 is stopped and the programs of the sequence circuits are changed by means of the keyboard 3.

Figure 15:
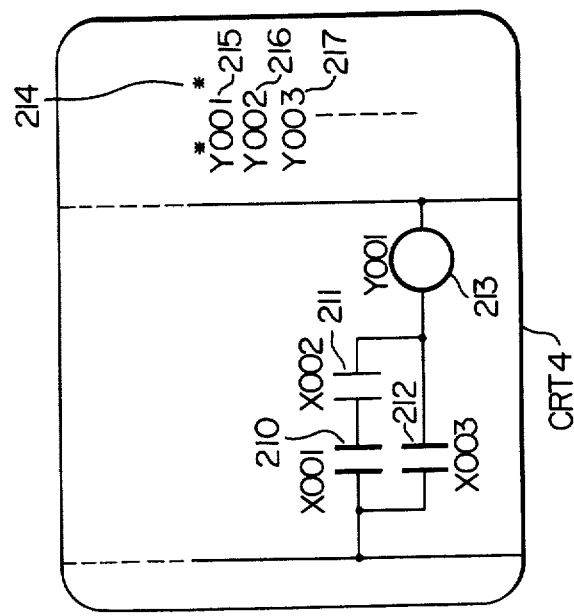
FIG. 15 is an example of information indicated on a CRT according to the flow chart in FIG. 13.

As in the first embodiment, for example, the sequence circuit 10A encircled with a chain dotted line C in FIG. 14 is first read from a sequence program memory 10 to display it on the CRT 4 (see FIG. 15).

Next, the on/off states of the input contacts X001, X002 and X003 in the sequence circuit 10A on the CRT are set by means of the keyboard 3 (steps 110 to 113), thereby to store the on/off states, that is, a binary level '1' or '0' into the associated input data areas 911 to 91N of the I/O buffer memory. A sequence processing unit 8 performs sequence operations sequentially on sequence programs in a sequence program memory 10 according to the above-set data of the input contacts and the other input contact data in the buffer memory, calculate sequentially the data of output contacts Y001 to Y00N, and store it to output areas 921 to 92N in the buffer memory.

Now, when the simulation button S4 of the mode buttons 31 is pushed on the keyboard 3, the data of all output contacts Y001 to Y00N is read from all the output areas 921 to 92N of the buffer memory and stored into a display work memory 14' (step 121). After this, in the display work memory, the data of the output contacts Y001 to Y00N of all sequence circuits prior to depression of the input button $S_3$ (the data of the output contacts determined by the data of the input contacts prior to depression of the input button $S_3$) will be compared with the data of all the output contacts subsequent to setting of the input contact data (the data of all the output contacts at the step 121) (step 122). The firmware 1' reads the comparison result from the display work memory 14' to detect the contact numbers of the output contacts that changed in state between before and after the depression of the input button $S_3$. The information of the detected output contact numbers is supplied from the display work memory 14' to the CRT 4 thereby displaying the output contact numbers thereon (step 123). FIG. 15 shows an example of how to indicate the changed states on the CRT 4. In FIG. 15, 214 is a title of changed states, and 215 to 217 are numbers of output contacts that changed in states. In this case, the changed states may be indicated so that the numbers of output contacts that changed from 'on' state to 'off' are indicated on CRT with light lines, and those that changed vice versa are with heavy lines.

Next, the data of the input contacts X001 to X003 and the output contact Y001 of the sequence circuit 10A on the current CRT screen are read from the buffer memory to be transferred to the data area 142 (see FIG. 16) of the display work memory 14' (step 124). The CRT 4 displays the on/off states of I/O contacts in the sequence circuit 10A on the screen according to the read data (step 125). The steps 121 to 123 may be carried out subsequent to the steps 124 and 125.

Figure 18:
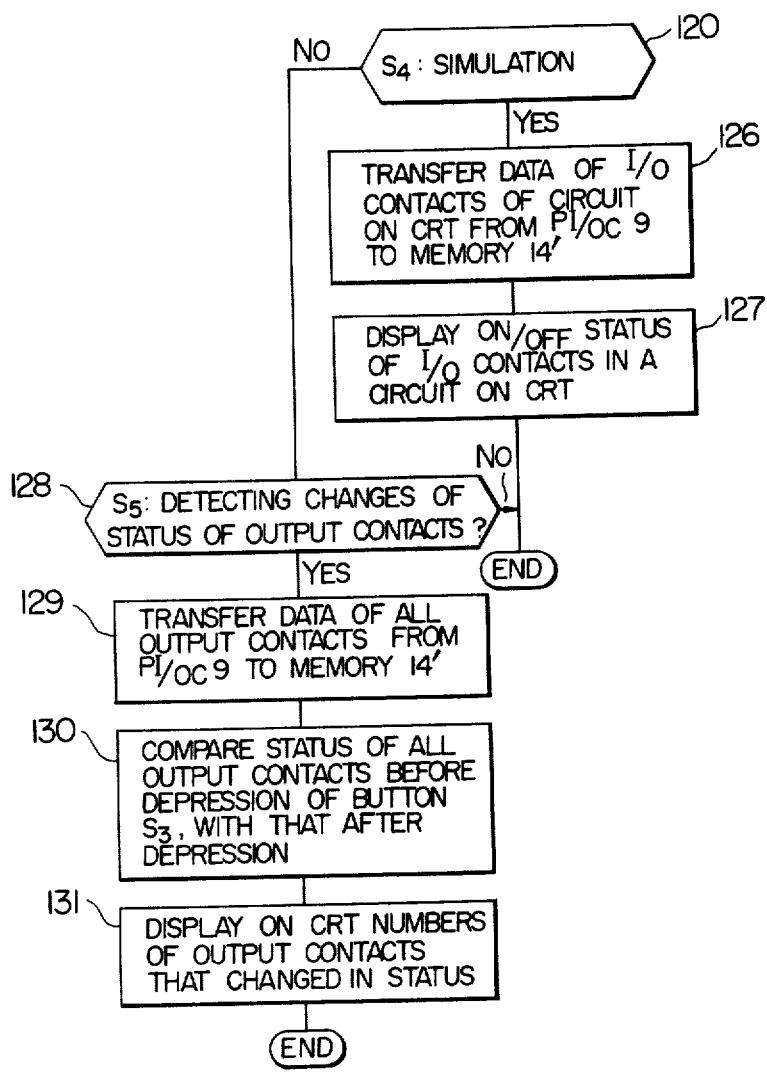
FIG. 18 is another flow chart of the firmware related to the system in FIG. 12.

In the above-mentioned operation, depression of the button S4, i.e. simulation, always provides display of the changed states of output contacts. However, the system may be arranged so that the display of status change in output contacts is carried out independently from simulation. A flow chart of programs of the firmware 1' with such an arrangement are shown in FIG. 18 in which the firmware 1' operates in the same manner as in the steps 101 to 113 in FIG. 13. In this embodiment of FIG. 18, the keyboard 3 is further mounted with an additional output states change detecting button S5 (not shown) in the mode buttons 31.

In FIG. 18, steps 120, 126 and 127 in which the read sequence circuit is simulated, is the same as the steps 120, 124 and 125 in FIG. 13.

In order to display the changed states of output contacts on the CRT, first, push the output states change detecting button S5 on the keyboard 3. This will start a program of the firmware 1' for output status change (step 128), thereby to read the data of all the output contacts stored in the output data areas 921 to 92N from the buffer memory to store them in the display work memory 14' (step 129). Next, specify or set the data of input contacts by means of the keyboard 3 according to the steps 110 to 113 in FIG. 13. Again, pushing the output states change detecting button S5 will read from the buffer memory the data of all output contacts determined by the set input data through the keyboard to store in the display work memory 14' (step 129). In the display work memory 14', the states of all output contacts prior to depression of the button $S_3$ is compared with that of all output contacts subsequent to the depression (step 130), whereby the numbers of output contacts that changed in states are indicated on the CRT (step 131).

Figure 16:
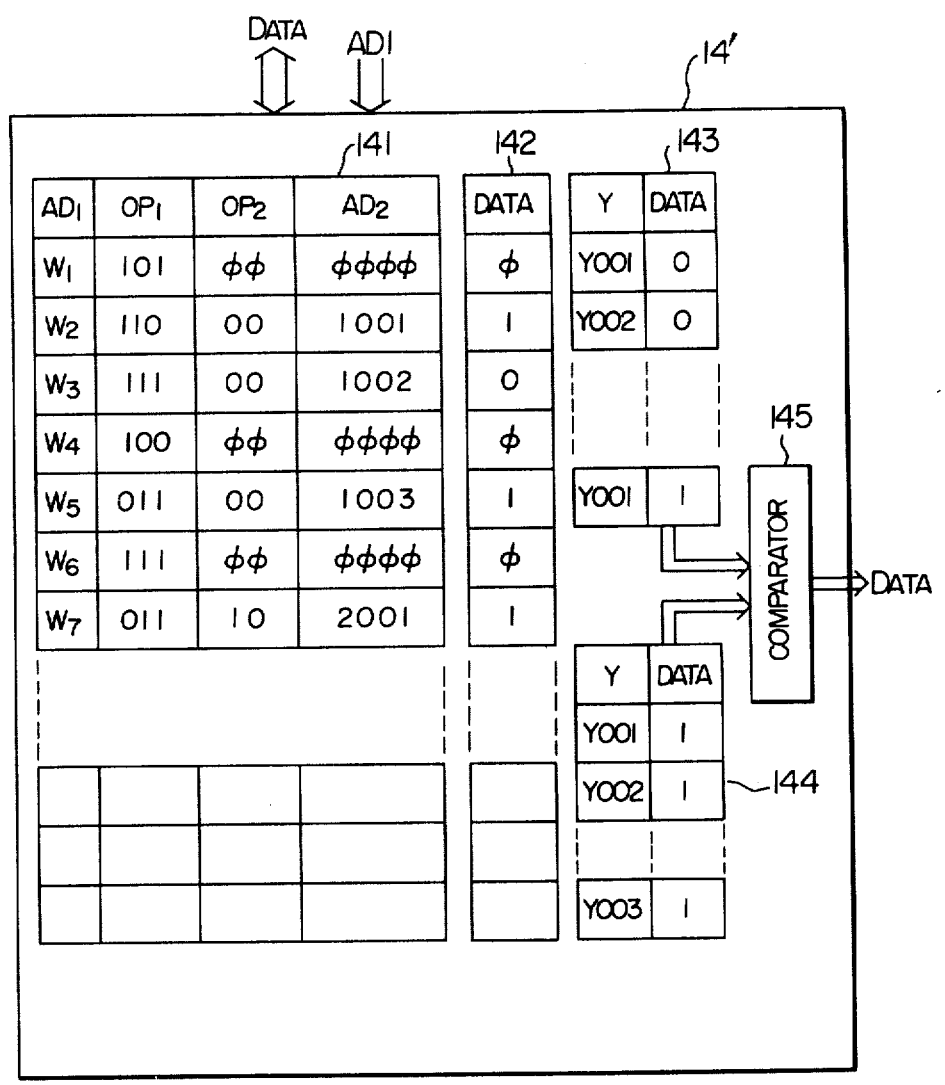
FIG. 16 is an example of the display work memory as provided in FIG. 12.
Figure 17:
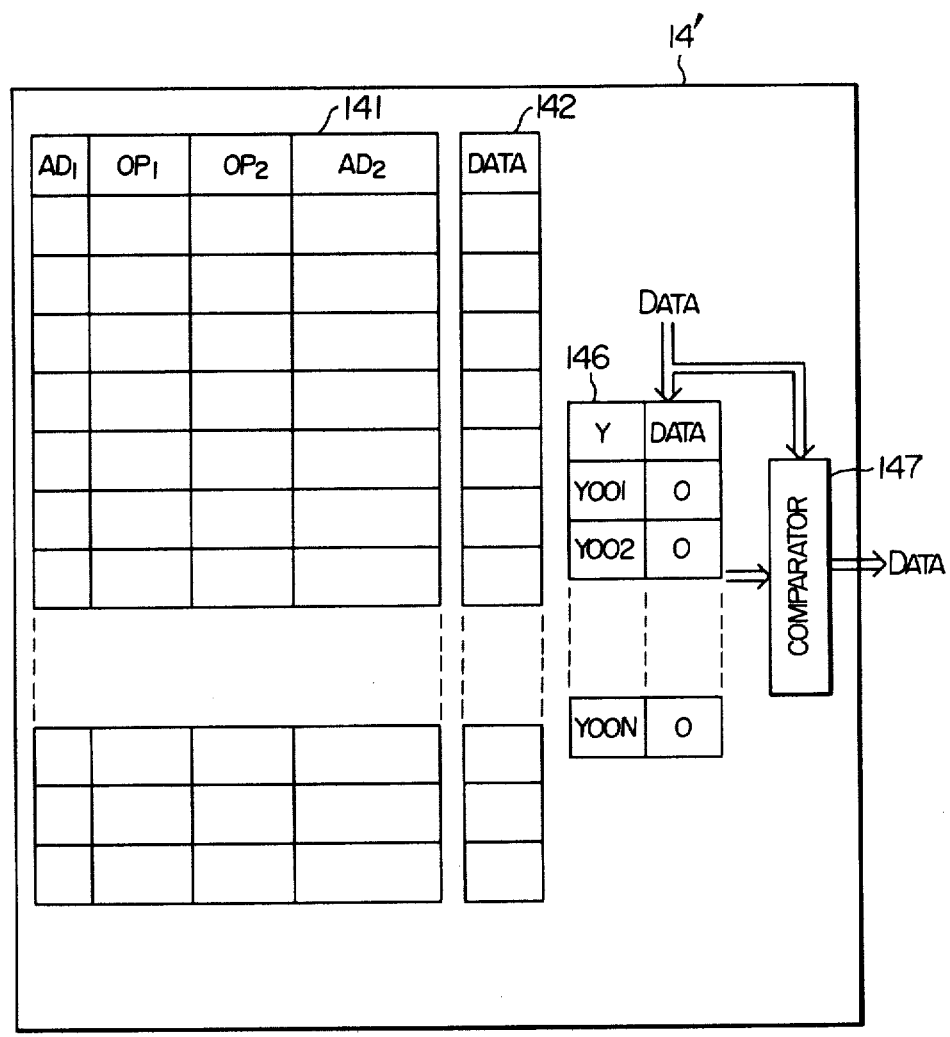
FIG. 17 is another example of the display work memory as provided in FIG. 12.

Referring now to FIGS. 16 and 17, there are shown the arrangements of the display work memory 14' according to the second embodiment of the present invention. An example of the display work memory 14' of FIG. 16 includes area 141 for storing machine words of branch information $OP_1$, contact information $OP_2$ and a contact number $AD_2$, for example, in the sequence circuit 10A on the CRT; and area 142 for storing the states of the I/O contacts stored in the area 141. The arrangements of the areas 141 and 142 are the same as those in FIG. 11. Further, the display work memory 14' has memory areas 143 and 144 for storing the data of output contacts in all the sequence circuits. The data of all the output contacts read from the buffer memory is stored alternately in the memory areas 143 and 144 according to a program (at the step 121 in FIG. 13) of the firmware 1'. Therefore, at one of the memory areas 143 and 144, the data of all output contacts prior to setting of the values of input contacts at the step 110 is stored, while, at the other, the data of all output contacts subsequent to the setting is stored. The data in the memory areas 143 and 144 is sent to a comparator 145 which compares the data of output contacts from the memory area 143 with that of output contacts from the memory area 144. The firmware 1' reads the comparison result of the comparator 145 to read the numbers of output contacts that changed in states for display on the CRT.

On the other hand, another example of the display work memory 14' of FIG. 17 includes memory area 146 for storing the data of output contacts. The data of all the output contacts read from the buffer memory at the step 121 is applied to the memory area 146, and at the same time, to a comparator 147. In this case, the memory area 146 stores the data of output contacts prior to setting of the data of the associated input contacts, and as soon as new output data is provided from the buffer memory to the memory area 146, the data already stored in the memory area 146 is sent to the comparator 147. Then, the comparator 147 compares the data of output contacts prior to setting of the data of the associated input contacts, with that of the output contacts subsequent to the setting. The firmware 1' reads the comparison result to read the numbers of output contacts that changed in states for display on the CRT.

This embodiment can also be applied in the case that the data of input contacts is input through the scanner 53 from the process input contacts 561 to 56N, in lieu of setting of the data by means of the keyboard. More specifically, supposing the firmware 1' operates in accordance with the flow chart of FIG. 13 to read a sequence circuit to be displayed on the CRT by means of the keyboard 3 at the steps 105 to 109 in FIG. 13. After this, push the simulation button S4 of the mode buttons 31 to transfer the data of all output contacts from the buffer memory to the display work memory 14' and to store, for example, in the memory area 143. Then, the comparator compares the data of all output contacts already stored in the memory area 144 prior to depression of the simulation button S4, with the all data now stored in the memory area 143 (step 122). The firmware 1' reads the comparison result to read the numbers of output contacts that changed in states thereby displaying them on the CRT.

As has been described, the sequence control system according to the present invention is arranged in such a manner that the contents of the I/O buffer memory in the process I/O controller is transferred in the display work memory in which the states of all I/O contacts is stored and a comparison is made between the states before and after setting of the data of the input contacts. This allows the operator to facilitate observation of the changes of state of the other sequence programs affected due to the changes of a selected sequence program.

It will be appreciated that the display work memory according to the present invention can be used not only as an external memory but also as a refresh memory for the CRT.

What we claim is:

1. A sequence controller for effecting sequence control of a process to be controlled by sequentially accessing and reading a selected one of a plurality of sequence programs, said sequence controller comprising:

a sequence program memory for storing a plurality of sequence programs;

a process I/O unit including a scanner and switching means, said scanner including means for sequentially inputting signals indicative of conditions of the process to be controlled through said switching means and for sequentially applying control signals to the process to be controlled through said switching means;

a buffer memory including an input memory portion for storing the signals indicative of the conditions of the process which are sequentially inputted from the process to be controlled through said process I/O unit, and an output memory portion for storing the control signals for the process which are sequentially obtained in accordance with a sequence program read out of said sequence program memory;

means for selectively connecting said buffer memory to said switching means in said process I/O unit for transmitting the signals indicative of the conditions of the process and the control signals for the process therebetween;

a sequence processing unit connected to said sequence program memory and said buffer memory for processing a sequence program selectively read out of said sequence program memory on the basis of data stored in said input memory portion of said buffer memory and applying results of the processing operation to said output memory portion as the control signals for the process;

setting means for manually selecting a sequence program in accordance with a sequence logic of the process to be controlled and for manually setting conditions of the process to be controlled, said setting means including means for outputting a first signal indicative of a selected sequence program and a second signal indicative of set conditions of the process;

control means connected to said setting means and coupled to said sequence program memory for selectively reading a corresponding sequence program from said sequence program memory in accordance with said first signal and for applying the selected sequence program to said sequence processing unit, and having means for setting the conditions of the process in said input memory portion in accordance with said second signal; and display means for selectively displaying conditions of a sequence program stored in said input and output memory portions of said buffer memory; whereby, when the conditions of the process are sequentially applied to said input memory portion and the control signals for the process are applied from said output memory portion to the process through said process I/O unit and said connecting means in response to said control means, said display means displays operating conditions of a sequence program selected by said setting means in accordance with the conditions of the process set in said input memory portion through said process I/O unit, and when said connecting means disconnects said process I/O unit from said buffer memory, said display means displays operating conditions of a sequence program selected by said setting means in accordance with the signals indicative of conditions of the process which are set by said setting means and stored in said input memory portion.

2. A sequence controller according to claim 1, further comprising comparing means including a memory section for reading and storing the control signals for the process of a sequence program selected by said setting means from said output memory portion, a comparator for comparing, for every reading of the control signal for the process, the control signal currently read from said output memory portion with the associated control signal stored in said memory section which was previously read from said output memory portion and means for applying the result of the comparison to said display means, whereby said display means displays the result of the comparison.

3. A sequence controller according to claim 1, further comprising comparing means including first and second memories for alternately reading and storing the control signals for the process of a sequence program selected by said setting means from said output memory portion, and a comparator for comparing, for every reading of the control signal for the process, the control signal currently read from said output memory portion and stored in one of said first and second memories with the associated control signal which was previously read from said output memory portion and stored in the other of said first and second memories, and means for applying the result of the comparison to said display means, whereby said display means displays the result of the comparison.

* * * * *